(12) United States Patent
Danwerth (10) Patent No.: US 9,250,115 B2
(45) Date of Patent: Feb. 2, 2016

(54) METHOD FOR WEIGHING MASSES ON A CONVEYER SYSTEM AND DEVICE FOR INJECTING LIQUID INTO FOOD PRODUCTS VIA A VERTICALLY MOVING NEEDLE CARRIER

(75) Inventor: Peter J. Danwerth, Steinhagen (DE)

(73) Assignee: Schröder Maschinenbau KG, Werther (DE)

( * ) Notice: Subject to any disclaimer, the term of this patent is extended or adjusted under 35 U.S.C. 154(b) by 165 days.

(21) Appl. No.: 14/124,322

(22) PCT Filed: May 21, 2012

(86) PCT No.: PCT/EP2012/059411
§ 371 (c)(1),
(2), (4) Date: Dec. 6, 2013

(87) PCT Pub. No.: WO2012/175262
PCT Pub. Date: Dec. 27, 2012

(65) Prior Publication Data
US 2014/0102811 A1   Apr. 17, 2014

(30) Foreign Application Priority Data

Jun. 22, 2011   (DE) .................. 10 2011 051 254

(51) Int. Cl.
| | |
|---|---|
| *G01G 11/04* | (2006.01) |
| *G01G 23/01* | (2006.01) |
| *A23L 3/3454* | (2006.01) |
| *A23B 4/28* | (2006.01) |
| *A22C 9/00* | (2006.01) |
| *A22C 17/00* | (2006.01) |
| *A23L 3/3589* | (2006.01) |

(52) U.S. Cl.
CPC .............. *G01G 23/01* (2013.01); *G01G 11/046* (2013.01); *A22C 9/001* (2013.01); *A22C 17/0053* (2013.01); *A23B 4/28* (2013.01); *A23L 3/3589* (2013.01)

(58) Field of Classification Search
CPC ...... G01G 11/04–11/046; G01G 11/14–11/18; G01G 23/01; A23B 4/28; A23B 4/285; A22C 9/001; A22C 17/0053; A23L 3/3589
See application file for complete search history.

(56) References Cited

U.S. PATENT DOCUMENTS

| | | | | |
|---|---|---|---|---|
| 2,954,969 | A | * 10/1960 | McCullough et al. | ........ 177/145 |
| 3,439,761 | A | 4/1969 | Laimins | |
| 4,126,196 | A | 11/1978 | Hyer et al. | |
| 4,509,609 | A | 4/1985 | Meiring | |
| 4,526,244 | A | * 7/1985 | Chauveau | .......................... 177/1 |

(Continued)

FOREIGN PATENT DOCUMENTS

| | | |
|---|---|---|
| DE | 19628898 A1 | 1/1997 |
| DE | 20303126 | 4/2004 |

(Continued)

*Primary Examiner* — Randy W Gibson
(74) *Attorney, Agent, or Firm* — Richard M. Goldberg (57) ABSTRACT

A method for weighing masses on a conveyor system (18) on which the masses to be weighed are advanced in horizontal direction and which includes a conveyor section (24) that is limp in a vertical bending direction, including the steps of continuously measuring the weight force that acts upon the limp conveyor section (24) while the masses are advanced on this conveyor section, recording a force/displacement function that indicates the weight force as a function of the distance traveled by the conveyor system (18), and calculating the mass flow rate of the conveyor system by evaluating the force/displacement function.

3 Claims, 5 Drawing Sheets

(56) References Cited

U.S. PATENT DOCUMENTS

| | | | |
|---|---|---|---|
| 4,557,341 A * | 12/1985 | Soderholm | 177/16 |
| 4,611,676 A | 9/1986 | Meiring | |
| 5,686,653 A * | 11/1997 | Homer et al. | 73/1.13 |
| 5,802,674 A * | 9/1998 | Barber | 19/105 |
| 6,545,231 B1 * | 4/2003 | Hafner | 177/119 |
| 8,188,384 B2 * | 5/2012 | Verhaar | 177/119 |
| 2007/0160720 A1 * | 7/2007 | Grosse-Butenuth | 426/240 |
| 2008/0283306 A1 * | 11/2008 | Grove | 177/1 |

FOREIGN PATENT DOCUMENTS

| | | |
|---|---|---|
| EP | 0496693 A2 | 7/1992 |
| EP | 1839489 A1 | 10/2005 |

\* cited by examiner

METHOD FOR WEIGHING MASSES ON A CONVEYER SYSTEM AND DEVICE FOR INJECTING LIQUID INTO FOOD PRODUCTS VIA A VERTICALLY MOVING NEEDLE CARRIER

BACKGROUND OF THE INVENTION

The invention relates to a method and the device for weighing masses and to a device for treating food products, comprising a conveyor, a treatment device, and input scales and output scales disposed at the conveyor upstream and downstream of the treatment device in the direction of conveyance.

An example of a device of the last-mentioned type is an injector with which brine or other liquids are injected into food products such as meat, fish or poultry.

A known device of this type has been described in DE 196 28 898 A1. The input scales and the output scales serve for measuring the weight of the food product in the state prior to the injection of the liquid and after the injection, so that, by comparing the measurement results, the increase in weight of the food products and, accordingly, the amount of injected liquid can be determined. The conveyor is divided into three distinct conveyor sections one of which forms the scales table of the input scales and another forming the scales table of the output scales. The treatment device (the injector) is disposed above another conveyor section that interconnects the sections associated with the input scales and the output scales, so that a continuous conveyor path for the food products is established, the products being transferred from an end of each conveyor section to the subsequent section. The scales tables of the input scales and the output scales, which are respectively formed by one of the conveyor sections, are thus uncoupled mechanically, so that only those products are weighed that are present on the respective scales table. The products are advanced intermittently by means of the conveyor, and the cycle of the injector is synchronized with the cycle of the conveyor such that a needle carrier of the injector descends towards the intermediate conveyor section and the food products disposed thereon whenever the latter are at rest under the injector. The needle carrier is equipped with downwardly projecting needles that will then penetrate into the food products so that the liquid is injected into the product via the needles.

EP 1 839 489 A1 describes a pickling system in which the weight of ham can be measured before and after the pickling process. To that end, the pieces of ham are aligned on the conveyor in such a manner that they have equal intervals in the direction of conveyance, so that they can be weighed individually one after the other.

SUMMARY OF THE INVENTION

It is an object of the invention to provide a method that permits a continuous weighing of the masses on a conveyor.

According to the invention, this object is achieved by a method for weighing masses on a conveyor on which the masses to be weighed are conveyed in horizontal direction and which comprises a conveyor section that is limp in a vertical bending direction, the method comprising the steps of:
continuously measuring the weight force that acts upon the limp conveyor section while the masses are advanced on this conveyor section,
recording a force/displacement function that indicates the weight force as a function of the distance traveled by the conveyor system, and
calculating a mass flow rate of the conveyor by evaluating the force/displacement function.

This method is particularly useful in conjunction with the treatment of food products, e.g. in conjunction with a pickling injector, because, then, the food products may be supplied onto the conveyor in close succession or practically without intervals. This permits not only a higher efficiency in performing the weighing processes, but also a higher efficiency of the pickling device. As another advantage, the scales need no longer be synchronized with the working cycle of the pickling device. It is not even required that the pickling device or, more generally, the device for treating the food products, operates intermittently at all. For example, the pickling device could be equipped with co-moving needle carriers that move along with the conveyor so that the movement of the food products on the conveyor need not be interrupted.

Therefore, in addition to a device for performing the weighing method indicated above, the invention has also as its subject a device for treating food products of the type indicated above, wherein the input scales and the output scales operate pursuant to the method according to the invention.

Useful details and further developments of the invention are indicated in the dependent claims.

In an advantageous embodiment, the limp conveyor section is evenly supported by a force measuring device on a certain length. When a mass that may ideally be considered to be point-like is conveyed on the conveyor and reaches the supported conveyor section, the force measuring device shows an abrupt increase of the force. Then, this force remains almost constant while the mass moves over the supported conveyor section, and it drops abruptly to zero when the mass leaves the conveyor section. The mass value is then proportional not only to the measured force but also to the integral of the force/displacement function over the length of the supported conveyor section. When, in place of a single point-like mass, a continuous mass flow is to be weighed, the integral of the force/displacement function is proportional to the mass flow rate that can be measured continuously in this way, with a spatial resolution that corresponds to the length of the supported conveyor section.

As long as the conveyor runs with constant speed, the integration over the distance is equivalent to an integration over time. When, however, the integration is performed over the distance, the conveyor may also be operated with variable speed and, more particularly, even intermittently.

In the other hand, it is also possible to measure the mass distribution along the conveyor with higher resolution by evaluating the force/displacement function. When a batch of successive food products is supplied onto the conveyor, the force measurement provides a first signal when the first of these products reaches the supported conveyor section. While this product moves over the supported section, the force signal increases in the same amount as further products enter onto the supported section. At the end of a conveyor travelling distance that corresponds to the length of the supported section, one thus obtains the total weight of the products that are present on the supported section at that instant. When the conveyor continues to operate, the measured force increases when the mass of the new products being supplied is larger than the mass of the products that leave the supported section at the downstream end. Thus, if one differentiates the force/displacement function both at the beginning and at the end of the supported conveyor section and takes the difference between the two derivatives, one obtains a high-resolution value for the mass per unit length that leaves the weighing device.

Embodiments in which the limp conveyor section is supported on the force measuring device only at a single point are also conceivable, just as embodiments in which the limp conveyor section rests on a flap that is supported to be pivotable about a horizontal axis at one end and is supported on the force measuring device at the other end. In these cases, the force that is measured for an imagined point-like mass is dependent upon the distance between the mass point and the support point and the free end of the flap, respectively, because the mass acts in this case onto the force measuring device via a variable lever. For a point-like mass, the force/displacement curve will then have a ramp or saw-tooth shape. It is possible however to multiply this force/displacement function with a suitable correction function in order to obtain again a square-shaped signal for a point mass. When, then, in order to weigh a continuous mass flow, integration is performed over the distance traveled by the conveyor, the measured force/displacement function must be weighted or, mathematically, convolved with the correction function in order for the integral to be equivalent to the accumulated mass flow rate.

As force measuring device, it is preferable to use a known measuring device that permits a rapid and sensitive force measurement with little mechanical displacement of the force capturing member. The time which such a measuring cell requires for an individual force measurement is only in the order of magnitude of a millisecond, so that a force measurement with extremely high time resolution is possible.

In the device for treatment of food products according to the invention, the input scales and the output scales are respectively formed by weighing devices of the type that have been described above, and they are disposed at a common, continuous section of the conveyor. This has the advantage that no transfer of the products from one conveyor section to another is necessary. This permits not only a more compact design of the device but prevents also the occurrence of vibrations that would otherwise inevitably be associated with the hand-over of the products from one section to the next and would compromise the weighing result. The weighing may consequently be performed without having to wait for such vibrations to decay, so that a more exact result can be obtained in shorter time.

Preferably, the limp conveyor section is formed by a continuous conveyor belt. When foreign matter such as small pieces of meat, puddles of liquid, or the like are present on the conveyor belt, this foreign matter will move together with the products disposed on the conveyor belt, so that the products will be weighed by the input scales and the output scales always together with the same foreign matter. The foreign matter will therefore have no effect on the detection of the weight difference.

The device permits to make calibration measurements at any time while the treatment device is inactive. When, in case of an injector, for example, the supply of liquid to the needles is interrupted, it may be checked by means of such a calibration measurement whether the input scales and the output scales measure the same weight for the products before and after they pass through the treatment device. Optionally, it is also possible to place calibration weights on the conveyor so that the input scales and the output scales may also be calibrated in relation to the measured absolute weight. Since calibration measurements can be inserted in the running production process practically at any time, the correct calibration of the scales may be checked in short time intervals.

BRIEF DESCRIPTION OF THE DRAWINGS

Embodiment examples of the invention will now be described in conjunction with the drawings, wherein.

DETAILED DESCRIPTION

Figure 1:
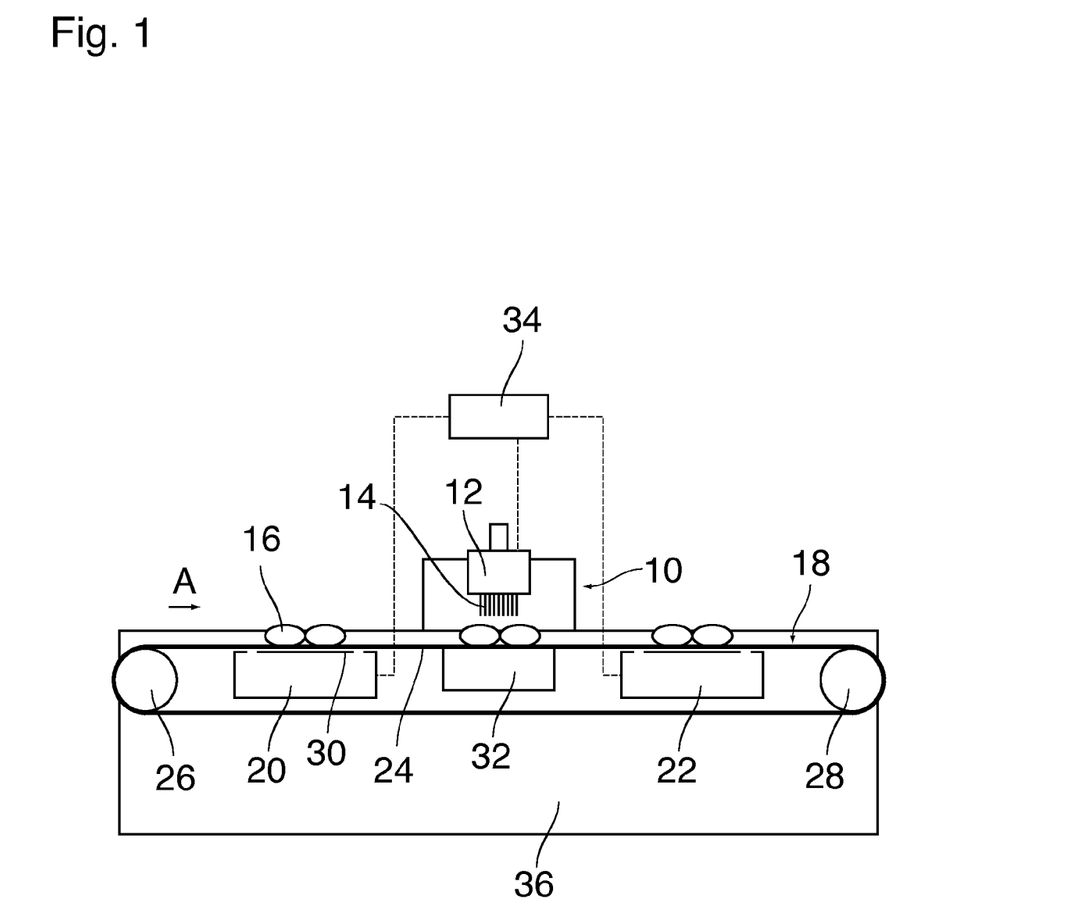
FIG. 1 is a schematic view of a device for treating food products.

As an example of a device for treating food products, FIG. 1 shows a pickling device. This pickling device has an injector 10 of a type that is known per-se, which comprises at least one needle carrier 12 that is adapted to be moved up and down cyclically and serves for injecting brine into food products 16 by means of hollow needles 14. The needle carrier 12 is installed above a conveyor 18 by means of which the food products 16 are supplied and discharged in a direction indicated by an arrow A.

At the conveyor 18, in a position upstream of the injector 10 as seen in the direction of conveyance, there are disposed input scales 20 in which the weight of the food products 16 prior to the injection may be determined. Output scales 22 that have the same design as the input scales are disposed downstream of the injector 10 and symmetrically to the input scales 20 with respect to the injector 10 and serve for determining the weight of the food products after the injection. By determining the difference in the weight of the same food products 16 before and after the injection, it is possible to measure the increase in weight that has been caused by the injection of liquid and, accordingly, to check the amount of injected liquid continuously during operation. If necessary, the amount of injected brine may be feedback-controlled by changing the injection pressure of the injection unit or by means of volumetric measures.

The conveyor 18 has a conveyor belt 24 that extends as a continuous conveyor section from a first deflection roller 26 via the input scales 20, the injector 10 and the output scales 22 to a second deflection roller 28. The conveyor belt 24 (the upper section thereof) rests on weighing plates 30 of the input scales 20 and the output scales 22. The conveyor belt 24 is limp in bending direction, so that the weight of the products 16 that are present on the conveyor belt above the respective scales acts onto the weighing plate 30 and causes a response of the scales. In the region of the injector 10 the conveyor belt 24 passes over a support 32 that prevents the conveyor belt from being deflected when the needles 14 penetrate into the food products.

An electronic control unit 34 controls the operations in the injector 10 and controls also a drive system for the conveyor belt that has not been shown here, and further receives measurement signals from the input scales 20 and the output scales 22 that may be operating permanently.

The injector 10 is mounted like a gate on a frame 36 that accommodates also the conveyor 18 and the input scales 20 and the output scales 22.

The conveyor 18 is driven intermittently and is synchronized with the working cycle of the injector 10 by means of the control unit 34. In one conveying step, food products 16 are advanced into the region below the needle carrier 12. In this position, the conveyor belt is stopped, and the needle carrier 16 begins its downwards stroke, so that the needles 14 penetrate into the food products and the brine is injected into the food products. Start and end timings of the supply of brine are controlled by the control unit 34 by means of valves that have not been shown. When the needle carrier 12 has reached its bottom dead centre, it moves upwards again, so that the needles 14 are withdrawn from the food products. At this instance, a stripper that has not been shown may strip the food products from the needles 14 and prevent that the food products are lifted together with the needles.

When the needle carrier approaches its top dead centre, the needles 14 have released the food products. In this phase, the control unit 34 activates the conveyor, and the input scales 20 measure the weight of the food products 16 that move over the input scales 20 in this stage. Simultaneously, the output scales 22 determine the weight of the food product 16 that have already passed the injector 10 and now move over the output scales 22. The measurement cycles of both scales are completed within a few, milliseconds. The measurement results are stored in the control unit 34. The measurement result supplied from the output scales 22 is compared to the stored measurement result that the input scales 20 has provided for the same products. In this way, the increase in weight of the food products resulting from the injection of liquid can be checked precisely.

Then, the next working cycle of the conveyor 18 begins. In this cycle, the food products that are shown in the drawing to be present below the needle carrier 12 are discharged via the output scales 22 whereas the food products that have been weighed on the input scales 20 now reach the position below the needle carrier 12. New food products (not shown) are supplied on the input side of the conveyor in arbitrary sequence. When the conveyor 18 stops again, a new operating cycle of the injector 10 begins, so that the next group of food products is treated.

If necessary, calibration measurements can be performed without having to stop the conveyor 18 and the injector 10. It is sufficient to interrupt only the supply of brine to the needles 14, so that, theoretically, the weight of the food products should not change, which can be checked by means of the input and output scales 20, 22. When, for any reason, a weight difference should nevertheless be detected, the measurement results are corrected (calibrated) accordingly.

The more detailed construction of the input scales 20 and the output scales 22 and the function thereof will now be explained with reference to FIGS. 2 to 5, taking the input scales 20 as a representative example.

Figure 2:
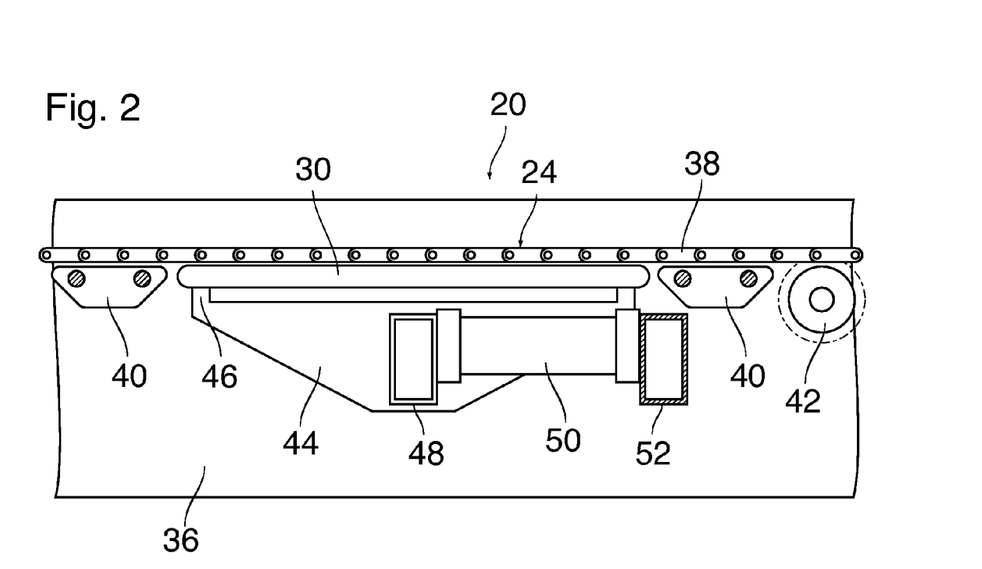
FIG. 2 is an enlarged schematic view of a mass weighing device forming part of the device shown in FIG. 1.
Figure 3:
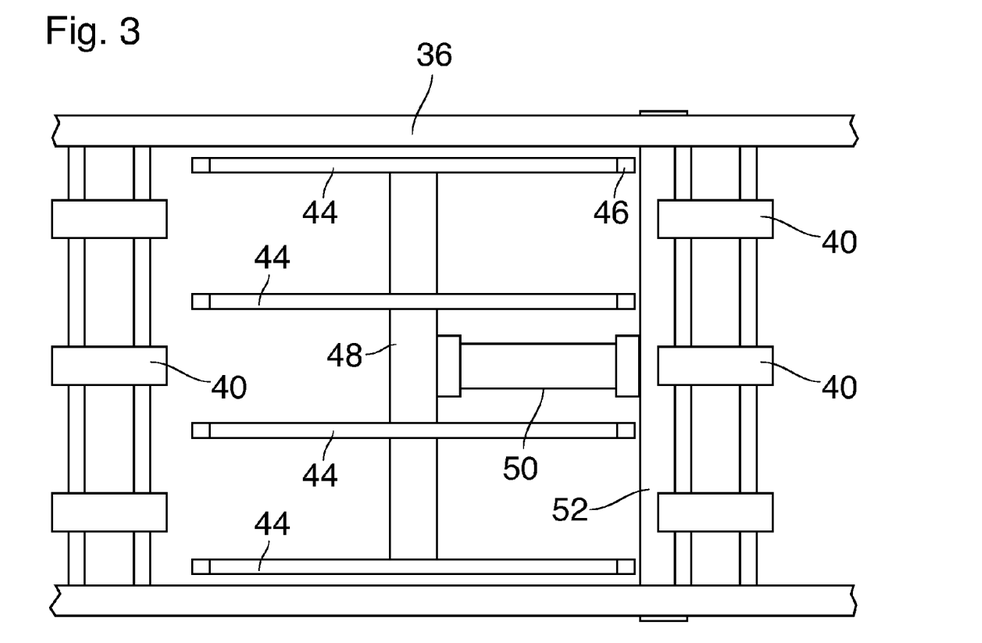
FIG. 3 is a plan view of the weighing device shown in FIG. 2.

As has been shown in FIG. 2, the conveyor belt 24 is formed by chain links 38 that are articulated to one another, so that the belt will be limp in bending direction and at the same time have a high tensile strength. Before and after the output scales 22 the conveyor belt rests on supports 40 that are rigidly mounted on the frame 36. A set of drive sprocket wheels 42 is disposed downstream of the rear support 40 so as to mesh with the conveyor belt 24 and are connected to the drive system for the conveyor 18 for effecting the advance of the conveyor belt.

A conveyor section of the conveyor belt 24 between the two supports 40 rests on the weighing plate 30. The weighing plate 30 is itself supported on four carriers 44 that are evenly distributed over the width of the conveyor, as has been shown in FIG. 3. For reasons of clarity, the conveyor belt 24 and the weighing plate 30 have been omitted in FIG. 3. On both ends, each of the carriers 44 has upwardly projecting support cams 46, by which the weighing plate 30 is supported uniformly and in a non-tiltable manner. All four carriers 44 are rigidly connected by a beam 48 that extends transverse to the direction of conveyance. The beam 48 is attached to a free end of a weighing cell 50 the other end of which is attached to a cross-bar 52. Whereas the beam 48 extends only between the carriers 44 and has no connection to the frame 36, the cross-bar 52 is rigidly fixed at the frame 36 with both ends. The cross-bar 52 and the beam 48 have profiles with high torsional rigidity, whereas the weighing cell 50 is configured as a bending bar that will be bent slightly when a load is applied onto the weighing plate 30.

Since the conveyor belt 24 is supported on the weighing plate 30 with low friction and is limp in vertical direction, the force of weight of a mass placed on the conveyor belt is directly transferred onto the weighing plate 30, thereby causing a corresponding bending deformation of the weighing cell 50. The amount of this deformation, the measurement stroke, is extremely small, however, so that the conveyor belt 24 is subject to practically no deflection in vertical direction, and, consequently the force measured by the weighing cell 50 is practically independent from the tension of the conveyor belt 24. If necessary, a set of drive wheels (not shown) may be disposed upstream of the weighing plate 30 in place of the drive sprocket wheels 42 or in addition thereto, so that a pushing force is applied to the conveyor belt 24 and, consequently, the conveyor belt is prevented from being tensioned.

Since the weighing plate 30 is evenly supported by the carriers 44 practically on its entire surface, the force measured by the weighing cell 50 will also be largely independent of the distribution of mass on the weighing plate.

Figure 4:
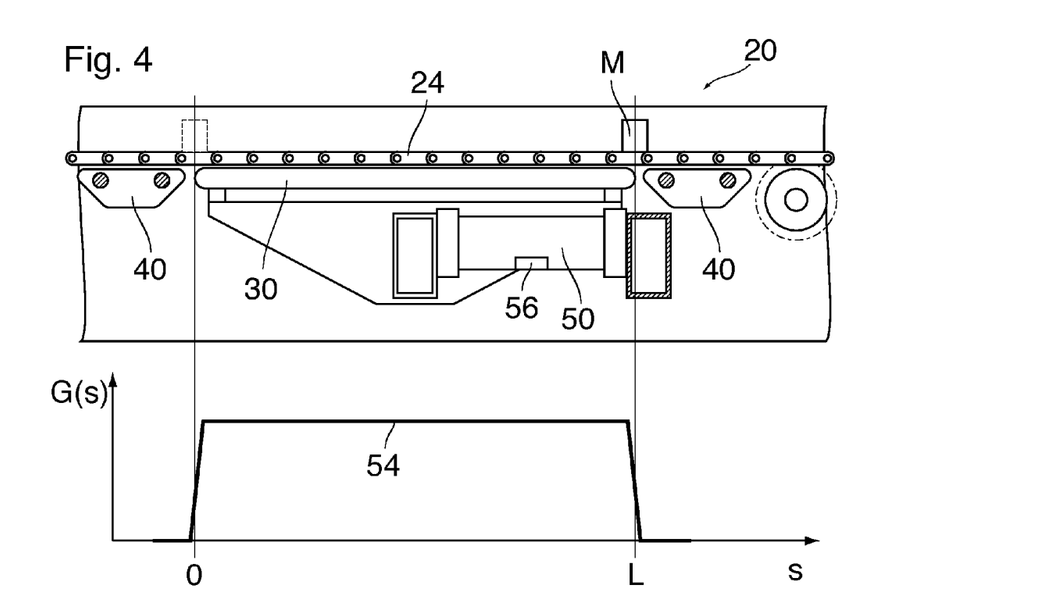
FIG. 4 is a diagram for explaining the weighing device when weighing a point-like mass.

This has been illustrated in FIG. 4 for the case that an almost point-like mass M is moved over the input scales 20 by means of the conveyor belt 24. Directly before and after the weighing plate 30 the conveyor belt is supported on the rigid supports 40. As long as the mass M is above these supports, no force will therefore be measured by the weighing cell 50. When the mass M leaves the front support 40 and reaches a position above the front end of the weighing plate 30 (shown in dashed lines in FIG. 4), the force G measured by the weighing cell 50 increases abruptly from zero to a value that is determined by the weight of the mass M. While the mass M moves over the weighing plate 30 together with the conveyor belt 40, the measured force remains almost constant. The measured force G as a function of the distance s traveled by the conveyor belt 24 has been represented in FIG. 4 as a force/displacement curve 54. It can be seen that this curve is almost square-shaped. The point s=0 corresponds to the position of the conveyor where the mass M reaches the front edge of the weighing plate 30 and, accordingly, the force increases abruptly. The distance s=L corresponds to the point at which the mass M leaves the weighing plate 30 again and, accordingly, the force G decreases abruptly to zero.

For the weighing cell 50 it takes only a time in the order of magnitude of 1 ms to perform a single force measurement, so that the force/displacement function represented by the curve 54 can be recorded with high time (and spatial) resolution. For practical purposes, a resolution in the order of magnitude of 1 s is generally sufficient, so that, when a force measurement is performed in intervals of one second, an average over about 1000 individual measurements can be sampled, and the noise can be suppressed accordingly. The measuring cell 50 has an integrated electronic processing device 56 that performs at least a pre-processing of the measurement signal. This processing device 56 receives from the control unit 34 a signal that indicates the speed of advance of the conveyor 18. Thus, the processing device 56 is capable of integrating the measured force signal over the distance s. Thus, the weight of the mass M may also be determined by integrating the measured force over the distance travelled by the conveyor belt from 0 to L and then dividing the integral by the length L of the weighing plate 30 (as measured in the direction of conveyance). When the mass M leaves the weighing plate 30 at the downstream end, the integral corresponds to the mass flow rate, i.e. the mass that the conveyor belt 24 has conveyed over the input scales 20 in the time interval in which the conveyor belt has moved by a distance corresponding to the length L of the weighing plate 30.

Figure 5:
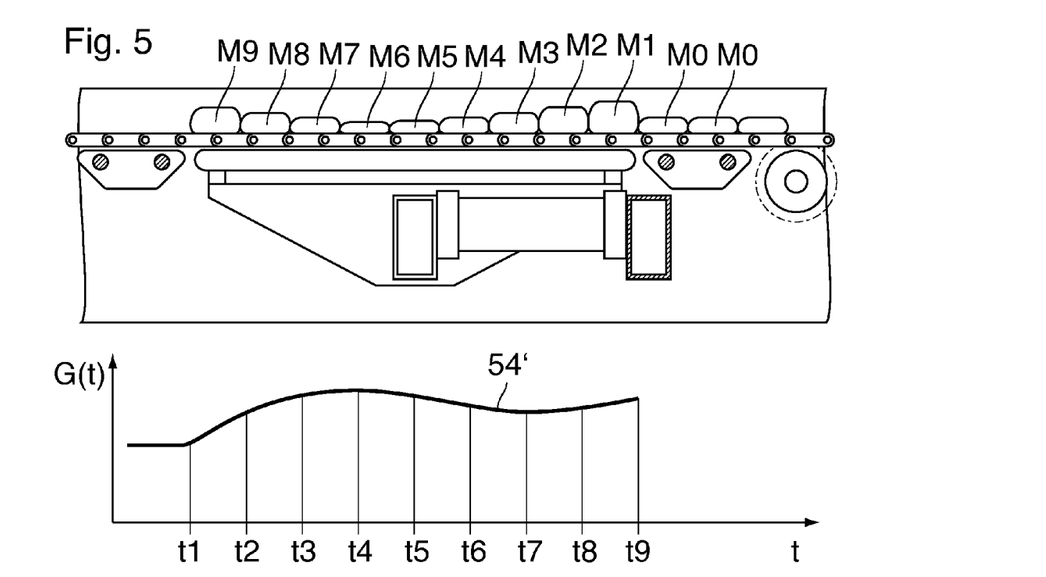
FIG. 5 is a diagram analogous to FIG. 4, for explaining the function of the weighing device when weighing a continuous mass flow.

This measurement principle may be used also when, in place of the almost point-like mass M, the conveyor belt 24 conveys an arbitrary distribution of masses as has been symbolized in FIG. 5 by a sequence of mass bodies M0-M9. In this case, the force/displacement curve will no longer have a square shape, but the mass flow rate will still be given by the distance integral of the force divided by the length L.

The integration may be continued without interrupt in order to obtain, after division by L, for any point in time, the accumulated mass that has left the input scales 20 since the start of the measurement.

In the diagram in FIG. 5, in place of the force/displacement function, the force/time function G(t) has been shown as a curve 54'. It will be understood that the time t can readily been be converted into the distance s by multiplying each time interval with the respective momentaneous speed of the conveyor belt 24.

In the example shown in FIG. 5, it has been assumed for illustration purposes that the conveyor belt 24 first supplies a sequence of mass bodies M0 which have all the same mass, so that the mass density on the conveyor belt is constant. Then, at the time t1, a larger mass body M1 reaches the upstream edge of the weighing plate 30. Since, at the same time, a smaller mass body M0 leaves the weighing plate 30 at the downstream end, the total of the mass that rests on the weighing plate increases, so that the curve 54 starts to rise at the time t1. While the mass bodies M2 and M3 enter successively onto the weighing plate, the curve 54' increases further, but the rate of increase becomes smaller because the size of the mass bodies decreases from M2 to M4. When, at the time t4, the mass M4 reaches the weighing plate, the curve does not rise anymore, because the mass body M4 has the same mass as the body M0 that leaves the weighing plate at this instant. When, subsequently, smaller mass bodies M5-M7 are supplied, the curve 54' descends, and it increases again when larger mass bodies M8 and M9 are supplied. The top part in FIG. 5 illustrates the state at the time t9. Thereafter, the large mass body M1 would leave the weighing plate so that the curve 54' would descend drastically.

The function value G(t9) at the time t9 is equal to the total mass of the mass bodies M1-M9 that rest on the weighing plate 30 at that instant. The distance integral, i.e. the area under the curve 54' between the times t1 and t9, divided by the length L of the weighing plate, corresponds to a floating average, i.e. a weighted sum of the masses of the mass bodies M1-M9 with weight factors linearly decreasing from M1-M9. When the conveyor belt has finally traveled the distance L once again and the last mass body M9 leaves the weighing plate, all mass bodies M1-M9 have contributed to the integral with the maximum weight factor, and the integral divided by L has increased since t1 by the total weight of the masses M1-M9.

When a batch of food products 16 shall be pickled with the device shown in FIG. 1, it is preferable that the food products 16 are loaded onto the conveyor 18 and moved through the pickling device in close succession, practically without intervals. When the first of these food products reaches the front end of the weighing plate 30 in the input scales 20, the force/time signal G(t) for this scales increases abruptly from zero to a higher value. The increase of this signal indicates to the control unit 34 that a batch of food products is being supplied, so that the control unit may thereupon control the conveyor 18 and the injector 10 with correct timing. Simultaneously, a continuous weighing of the masses by integrating the force/distance function G(s) is triggered. This integration is continued without interruptions and provides the total mass of the food products that are supplied to the injector 10. When the conveyor 18 is stopped in-between or moves with lower speed, this has no influence on the weighing of the masses, because the integral is not taken over time but over the distance s. The device may be configured such that an acoustic signal is produced when a pre-set target value for the total mass has been reached. This signal advises the personnel that the necessary amount of food products has been treated and no further food products shall be loaded onto the conveyor. On the other hand, the integration and, therewith, the weighing of masses may be stopped automatically when no new food products have been supplied during a certain time period.

The dwell time of the food products on the input scales, dependent upon the length L of the weighing plate 30, has the effect that the continuous mass weighing process is performed with averaging over time, with the dwell time as time constant. This averaging reduces the measurement noise and increases the measurement accuracy. Moreover, a greater length L of the weighing plate 30 helps to make the scales more robust against disturbances such as influences due to the tension of the conveyor belt 24.

If necessary, however, the mass flow rate may be determined with higher time resolution by evaluating the force/displacement function G(s). When a new batch of food products is supplied, the force/displacement function G(s) will increase monotonously in the time interval in which the first of these produces moves from the front edge to the rear edge of the weighing plate 30, because new products are supplied continuously but no products are leaving the weighing plate 30 on the downstream side as yet. At this instant, the rate of increase (derivative by the distance s) of this function indicates the mass distribution (mass per unit length in direction of conveyance) of the products on the weighing plate 30. This distribution can be stored. When the conveyor belt 24 moves further over the weighing plate 30, the value of the function G(s) changes by the balance of the mass that enters the weighing plate at the front end, diminished by the mass that leaves the weighing plate at the rear end. This latter mass, however, is known from the stored mass distribution. Consequently, the mass density of the string of products that reaches the upstream end of the weighing plate 30 at this point of time can be calculated from the current rate of increase of the function G(s) at the position s=0. In general, the mass density at a certain position $s_0$ along the conveyor belt is given by the rate of increase of the function G(s) at the position $s_0$ minus the (possibly negative) rate of increase at the position $s_0-L$. In this way, the mass balance can be updated continuously, and the mass distribution of the products can be recorded continuously with a spatial resolution that is significantly higher than the length of the weighing plate 30. For example, this high-resolution mass distribution may be utilized for controlling the injector 10 such that the injected amount of brine (or the injection pressure or injection time) is precisely adapted to the mass profile of the products passing through underneath the injector.

The output scales 22 operate in accordance with the same principle that has been described above for the input scales. By comparing the measurement results of the input scales and the output scales, it is then possible to determine the injected amount of brine, as is illustrated in FIGS. 6 and 7.

Figure 6:
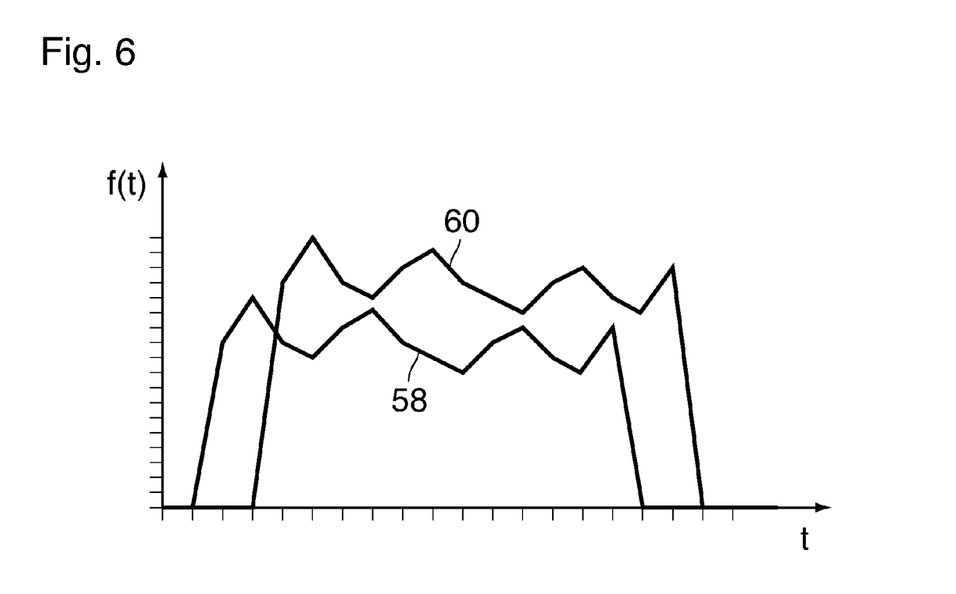
FIG. 6 is a diagram of measurement results of an input scales and an output scales of the treatment device shown in FIG. 1.

In FIG. 6, a curve 58 shows the mass flow rate φ(t) as a function of the time t, as measured with the input scales 20. Dependent upon the intended purpose and the desired accuracy, this curve can be recorded with averaging over the length L of the weighing plate 30 or with increased resolution.

The curve 60 in FIG. 6 shows the mass flow rate as measured with the output scales 22. The values are generally higher because brine has been injected into the food products 16 with the injector and this brine is also weighed by the output scales 22. Moreover, there is a time delay between the curves 58 and 60, corresponding to the time which the conveyor 18 needs to move the products from the input scales to the output scales.

Figure 7:
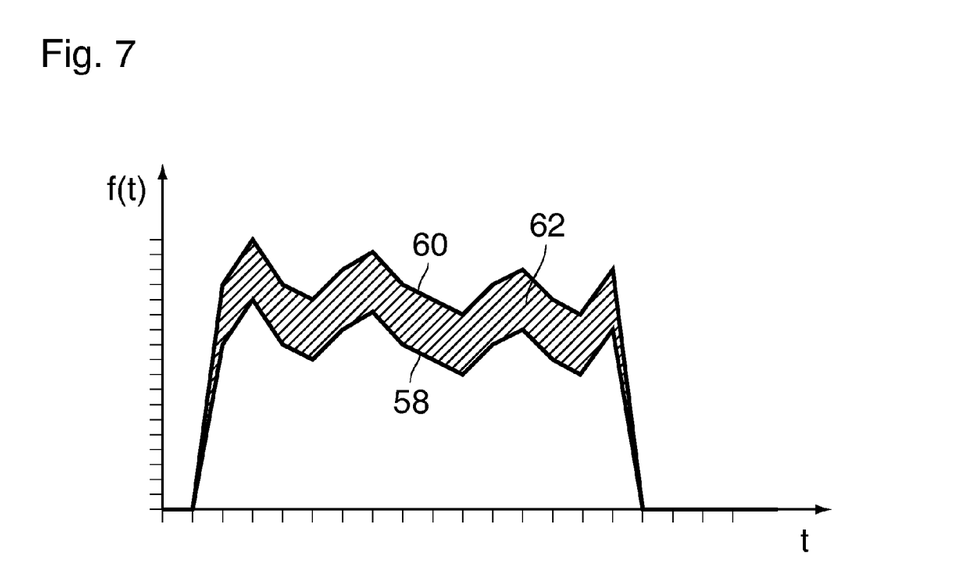
FIG. 7 is an illustration for explaining the evaluation of the diagram shown in FIG. 6.

In general, due to fluctuations of the injected mount of brine, the curve 60 will not be an exact copy of the curve 58, however, both curves have at least the same characteristic flanks, so that it is possible, by analyzing these characteristic flanks, to synchronize the two curves or, figuratively, to superpose them as has been shown in FIG. 7. Optionally, the synchronization may also be achieved on the basis of the known distance between the two scales and on the basis of the continuously monitored movement of the conveyor belt.

The area 62 that is enclosed between the curves 58 and 60 in FIG. 7 indicates the total amount of brine that has been injected into the batch of food products. This amount of brine can be determined by integration.

Correspondingly, the difference between the two curves 58 and 60 in FIG. 7 at a given time t is a measure for the mass flow of injected brine at that time.

It is not necessary to wait with the synchronization of the two curves 58 and 60 until the complete charge has been processed, but the synchronization can be preformed already as soon as the first products reach the output scales 22 (the synchronization can then be checked continuously and corrected, if necessary, by further monitoring the characteristic flanks). In this way, one obtains immediately after the injection of the brine, i.e. as soon as the products in which the brine has been injected reach the output scales 22, a feedback on the injected amount of brine. Then, based on this feedback, the injected amount of brine can be controlled to a target value with little feedback delay, and the target value may itself be dependent upon the mass distribution of the food products that has been measured (with in input scales 20).

Figure 8:
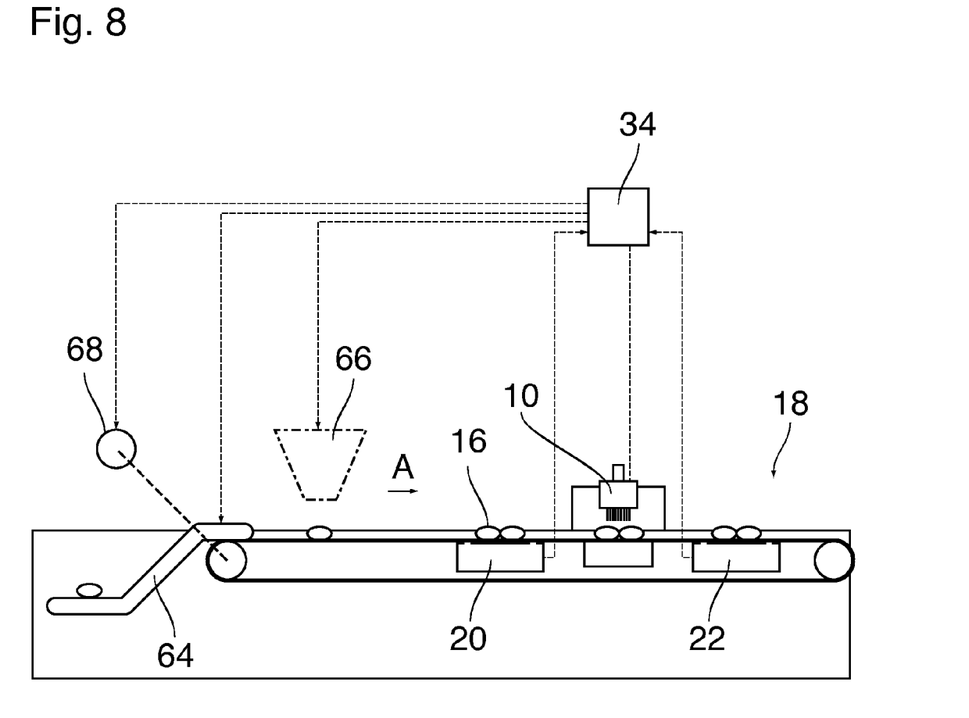
FIG. 8 is a schematic view of an apparatus according to FIG. 1 together with several equipments for supplying food products onto a conveyor.

The weighing device according to the invention that is formed by the input scales 20 and of the output scales 22 may generally be used for optimizing the degree of capacity utilization of a product processing line. As an example, FIG. 8 shows a processing line that is formed by the conveyor 18 and the injector 10 and a Z-conveyor 64 with which the food products 16 are loaded onto the conveyor 18 at the upstream end. As is generally known, the Z-conveyor 64 has an upstream section on which the food products may be placed manually, for example, a rising section and a transfer section from which the food products drop onto the conveyor belt of the conveyor 18. The speed of the Z-conveyor 64 is independent from the speed of the conveyor 18 and can be controlled by the control unit 34. If the personnel is instructed to load new products onto the loading section of the Z-conveyor as soon as the products that have been loaded earlier reach the rising section, then the speed of the Z-conveyor 64 determines the product flow rate of the processing line and, consequently, the density with which the products will finally be placed on the conveyor 18 and supplied to the injector 10.

Now, it shall be assumed that the injector 10 has a certain processing capacity that can be indicated as a processed amount of meat per time unit. The mass flow rate measured by means of the input scales 20 or the output scales 22. This mass flow rate is sent to the control unit 34 as a feedback signal, and the control unit will control the speed of the Z-conveyor 64 on the basis of this feedback signal in such a manner that the injector 10 will always operate at its capacity limit, so that the degree of capacity utilization is optimal.

Of course, the same is possible also with other devices for treating food products or with other products.

As an alternative, the control unit 34 may control a hopper 66 that is disposed by the conveyor 18 and determines the cycle with which new products are dropped onto the conveyor 18.

FIG. 8 further shows a symbolic representation of a motor 68 that drives the conveyor 18. This also permits, for example, a mode of operation in which the personnel is instructed to place the food products compactly, without intervals, on the section of the conveyor 18 upstream of the input scales 20. The mass flow rate is then determined by the speed of the conveyor 18 and may be feedback-controlled by the control unit 34 controlling the motor 68 on the basis of the mass flow rate as determined by the input scales 20 or the output scales 22.

The invention claimed is:

1. A device for treating food products, comprising:
    a conveyor system that includes a conveyor section that is limp in a vertical bending direction,
    a treatment device and
    an input scale and an output scale that are disposed at the conveyor system upstream and downstream of the treatment device in a direction of conveyance,
    wherein the input and output scales are devices for weighing masses on the conveyer system on which the masses to be weighed are advanced in a horizontal direction and are disposed at a common, continuous conveyor section of the conveyor system,
    wherein each of the devices for weighing masses includes:
        a force measuring device that supports the limp conveyor section from below, and
        an electronic processing device for recording a force/displacement function that indicates a measured weight force as a function of a distance traveled by the conveyor system, and for calculating a mass flow rate of the conveyor system by evaluating the force/displacement function, and
    wherein the treatment device comprises a needle carrier that is adapted to be moved up and down cyclically and that is equipped with needles for injecting liquid into the food products.

2. The device according to claim 1, wherein the limp conveyor section is supported, over a predetermined length in a direction of conveyance, on a weighing plate that is supported on the force measuring device in a non-tiltable manner.

3. The device according to claim 2, wherein the force measuring device is configured as a horizontally extending bending bar that has one end fixed to a point below a center of the weighing plate and an opposite end fixed to a member that is rigidly connected to a frame.

* * * * *